US009792201B2

(12) United States Patent
Kuroda

(10) Patent No.: US 9,792,201 B2
(45) Date of Patent: Oct. 17, 2017

(54) TEST SUPPORT DEVICE AND TEST SUPPORT METHOD

(71) Applicant: NEC Corporation, Minato-ku, Tokyo (JP)

(72) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 14/649,292

(22) PCT Filed: Dec. 6, 2013

(86) PCT No.: PCT/JP2013/007192
§ 371 (c)(1),
(2) Date: Jun. 3, 2015

(87) PCT Pub. No.: WO2014/091732
PCT Pub. Date: Jun. 19, 2014

(65) Prior Publication Data
US 2015/0317239 A1   Nov. 5, 2015

(30) Foreign Application Priority Data

Dec. 11, 2012  (JP) ................................ 2012-270364

(51) Int. Cl.
*G06F 11/36* (2006.01)
*G06F 9/44* (2006.01)

(52) U.S. Cl.
CPC ............ *G06F 11/3664* (2013.01); *G06F 8/71* (2013.01); *G06F 8/75* (2013.01); *G06F 11/368* (2013.01); *G06F 11/3684* (2013.01)

(58) Field of Classification Search
CPC ............ G06F 11/3664; G06F 11/3668; G06F 11/3672; G06F 11/3676; G06F 11/368; G06F 11/3684; G06F 8/75; G06F 8/71
See application file for complete search history.

(56) References Cited

U.S. PATENT DOCUMENTS

| 6,993,448 B2 * | 1/2006 | Tracy ................... G06F 21/577 702/119 |
| 8,799,869 B2 * | 8/2014 | Grechanik .......... G06F 11/3684 717/126 |

(Continued)

FOREIGN PATENT DOCUMENTS

| JP | H07114465 A | 5/1995 |
| JP | H10040091 A | 2/1998 |

(Continued)

OTHER PUBLICATIONS

International Search Report for PCT Application No. PCT/JP2013/007192, mailed on Jan. 14, 2014.

(Continued)

*Primary Examiner* — Emerson Puente
*Assistant Examiner* — Erika Kretzmer

(57) ABSTRACT

A test support device which can test all configurations of a system including a specific system component, comprehensively and quickly, is provided. A test support device (100) includes a storage unit (102) and an extraction processing unit (101). A configuration of a system is defined with a plurality of functionalities to be maintained by the system and a set of programs implementing the functionalities respectively. The storage unit (102) stores component-relation information (201) which indicates an identifier of each of one or more systems, an identifier of each of a plurality of functionalities to be maintained by each of the systems, and an identifier of each of one or more programs being capable of implementing each of the functionalities. The extraction processing unit (101) extracts, when a functionality or a program is specified, a configuration of a system including the specified functionality or the specified program on the basis of the component-relation information (201), and outputs the extracted configuration of a system.

5 Claims, 21 Drawing Sheets

(56) References Cited

U.S. PATENT DOCUMENTS

| | | | | |
|---|---|---|---|---|
| 2002/0042687 A1* | 4/2002 | Tracy | ................... | G06F 21/577 |
| | | | | 702/119 |
| 2004/0073890 A1* | 4/2004 | Johnson | ................ | G06F 11/368 |
| | | | | 717/124 |
| 2007/0106982 A1* | 5/2007 | Dalal | ........................ | G06F 8/71 |
| | | | | 717/128 |
| 2011/0055153 A1 | 3/2011 | Hashimoto et al. | | |
| 2012/0116561 A1* | 5/2012 | Nakagawa | .......... | G06F 11/3664 |
| | | | | 700/97 |
| 2012/0143570 A1* | 6/2012 | Austin | ................... | G06Q 10/00 |
| | | | | 703/1 |
| 2013/0086556 A1* | 4/2013 | Grechanik | .......... | G06F 11/3684 |
| | | | | 717/126 |

FOREIGN PATENT DOCUMENTS

| JP | H11306046 A | 11/1999 |
|---|---|---|
| JP | 2010-033373 A | 2/2010 |
| JP | 2011028313 A | 2/2011 |
| JP | 2011118637 A | 6/2011 |

OTHER PUBLICATIONS

English Translation of written opinion for PCT Application No. PCT/JP2013/007192.

International Business Machines Corporation, IBM Workload Deployer "Pattern-based Application and Middleware Deployments in Private Clpiud", 2012 <URL: http://www.redbooks.ibm.com/redbooks/SG248011/wwhelp/wwhimpl/js/html/wwhelp.htm>.

Zhou Diting, "Research for Software Product Family Component Programming and The Model of Software Configuration", Dissertation Submitted to Zhejiang University of Technology for the Degree of Master, Chinese Master's Dissertations Full-Text Databases (CMFD) Apr. 2009, vol. 2002, No. 2, total 81 pages.

Hazeline U. et al., "Software Traceability with Topic Modeling", The 32nd ACM/IEEE International Conference on Software Engineering (ICSE 2010), May 2010, vol. 1, pp. 95-104 (total 12 pages).

Communication dated Feb. 4, 2017 from the State Intellectual Property Office of the P.R.C. in counterpart Application No. 201380071450.3.

Japanese Office Action for JP Application No. 2014-551882 dated Jul. 11, 2017 with English Translation.

* cited by examiner

Fig. 8

202a COMPONENT INFORMATION (PRODUCT)

| COMPONENT TYPE | PRODUCT |
|---|---|
| PRODUCT ID | mysql |
| IMPLEMENTABLE FUNCTIONALITY | rdb |

202b COMPONENT INFORMATION (FUNCTIONALITY)

| COMPONENT TYPE | FUNCTIONALITY |
|---|---|
| FUNCTIONALITY ID | rdb |
| IMPLEMENTABLE FUNCTIONALITY | db |

202c COMPONENT INFORMATION (MODEL)

| COMPONENT TYPE | MODEL | |
|---|---|---|
| MODEL ID | web3tier | |
| REQUIRED FUNCTIONALITY | rdb | |
| | ap-svr | |

Fig. 9

301 TEST CASE INFORMATION

| TEST CASE ID | mysql_test | |
|---|---|---|
| TEST TARGET | mysql | |
| TEST CONTENTS | COMMAND | aptitude show mysql |
| | JUDGMENT CONDITION | RESPONSE TO COMMAND : OK |

Fig. 10

401a FUNCTIONALITY IMPLEMENTATION INFORMATION (web3tier)

| REQUIRED MODEL | REQUIRED FUNCTIONALITY | IMPLEMENTING FUNCTIONALITY | IMPLEMENTING PRODUCT |
|---|---|---|---|
| -- | rdb | -- | mysql |
| | ap-svr | -- | d |
| | | | e |

401b FUNCTIONALITY IMPLEMENTATION INFORMATION (mail_web3tier)

| REQUIRED MODEL | REQUIRED FUNCTIONALITY | IMPLEMENTING FUNCTIONALITY | IMPLEMENTING PRODUCT |
|---|---|---|---|
| web3tier | rdb | -- | mysql |
| | ap-svr | -- | d |
| | | | e |
| -- | mail-svr | -- | f |

401c FUNCTIONALITY IMPLEMENTATION INFORMATION (batch)

| REQUIRED MODEL | REQUIRED FUNCTIONALITY | IMPLEMENTING FUNCTIONALITY | IMPLEMENTING PRODUCT |
|---|---|---|---|
| -- | cache-svr | -- | a |
| | db | rdb | mysql |

Fig. 11

501a SYSTEM CONFIGURATION INFORMATION

| CONFIGURATION ID | MODEL | REQUIRED MODEL | REQUIRED FUNCTIONALITY | IMPLEMENTING FUNCTIONALITY | IMPLEMENTING PRODUCT | TEST CASE |
|---|---|---|---|---|---|---|
| 1 | web3tier | — | rdb | — | mysql | mysql_test |
| | | | ap-svr | — | d | d_test |
| 2 | web3tier | — | rdb | — | mysql | mysql_test |
| | | | ap-svr | — | e | e_test |
| 3 | mail_web3tier | web3tier | rdb | — | mysql | mysql_test |
| | | | ap-svr | — | d | d_test |
| | | | mail-svr | — | f | f_test |
| 4 | mail_web3tier | web3tier | rdb | — | mysql | mysql_test |
| | | | ap-svr | — | e | e_test |
| | | | mail-svr | — | f | f_test |
| 5 | batch | — | cache-svr | — | a | a_test |
| | | | db | rdb | mysql | mysql_test |

Fig. 12

401d FUNCTIONALITY IMPLEMENTATION INFORMATION (batch)

| REQUIRED MODEL | REQUIRED FUNCTIONALITY | IMPLEMENTING FUNCTIONALITY | IMPLEMENTING PRODUCT |
|---|---|---|---|
| -- | cache-svr | -- | a |
| | db | -- | b |
| | | rdb | mysql |
| | | | c |

Fig. 13

501b SYSTEM CONFIGURATION INFORMATION

| CONFIGURATION ID | MODEL | REQUIRED MODEL | REQUIRED FUNCTIONALITY | IMPLEMENTING FUNCTIONALITY | IMPLEMENTING PRODUCT | TEST CASE |
|---|---|---|---|---|---|---|
| 1 | batch | — | cache-svr | — | a | a_test |
| | | | db | — | b | b_test |
| 2 | batch | — | cache-svr | — | a | a_test |
| | | | db | rdb | mysql | mysql_test |
| 3 | batch | — | cache-svr | — | a | a_test |
| | | | db | rdb | c | c_test |

Fig. 14

401e FUNCTIONALITY IMPLEMENTATION INFORMATION (web3tier)

| REQUIRED MODEL | REQUIRED FUNCTIONALITY | IMPLEMENTING FUNCTIONALITY | IMPLEMENTING PRODUCT |
|---|---|---|---|
| -- | rdb | -- | mysql |
| | | | c |
| | ap-svr | -- | d |
| | | | e |

401f FUNCTIONALITY IMPLEMENTATION INFORMATION (mail_web3tier)

| REQUIRED MODEL | REQUIRED FUNCTIONALITY | IMPLEMENTING FUNCTIONALITY | IMPLEMENTING PRODUCT |
|---|---|---|---|
| web3tier | rdb | -- | mysql |
| | | | c |
| | ap-svr | -- | d |
| | | | e |
| -- | mail-svr | -- | f |

401g FUNCTIONALITY IMPLEMENTATION INFORMATION (batch)

| REQUIRED MODEL | REQUIRED FUNCTIONALITY | IMPLEMENTING FUNCTIONALITY | IMPLEMENTING PRODUCT |
|---|---|---|---|
| -- | cache-svr | -- | a |
| | db | rdb | mysql |
| | | | c |

Fig. 15

501c SYSTEM CONFIGURATION INFORMATION

| CONFIGURATION ID | MODEL | REQUIRED MODEL | REQUIRED FUNCTIONALITY | IMPLEMENTING FUNCTIONALITY | IMPLEMENTING PRODUCT | TEST CASE |
|---|---|---|---|---|---|---|
| 1 | web3tier | --- | rdb | --- | mysql | mysql_test |
|   |          |     | ap-svr | --- | d | d_test |
| 2 | web3tier | --- | rdb | --- | mysql | mysql_test |
|   |          |     | ap-svr | --- | e | e_test |
| 3 | web3tier | --- | rdb | --- | c | c_test |
|   |          |     | ap-svr | --- | d | d_test |
| 4 | web3tier | --- | rdb | --- | c | c_test |
|   |          |     | ap-svr | --- | e | e_test |
| 5 | mail_web3tier | web3tier | rdb | --- | mysql | mysql_test |
|   |               |          | ap-svr | --- | d | d_test |
|   |               |          | mail-svr | --- | f | f_test |
| 6 | mail_web3tier | web3tier | rdb | --- | mysql | mysql_test |
|   |               |          | ap-svr | --- | e | e_test |
|   |               |          | mail-svr | --- | f | f_test |
| 7 | mail_web3tier | web3tier | rdb | --- | c | c_test |
|   |               |          | ap-svr | --- | d | d_test |
|   |               |          | mail-svr | --- | f | f_test |
| 8 | mail_web3tier | web3tier | rdb | --- | c | c_test |
|   |               |          | ap-svr | --- | e | e_test |
|   |               |          | mail-svr | --- | f | f_test |
| 9 | batch | --- | cache-svr | --- | a | a_test |
|   |       |     | db | rdb | mysql | mysql_test |
| 10 | batch | --- | cache-svr | --- | a | a_test |
|    |       |     | db | rdb | c | c_test |

Fig. 16

401h FUNCTIONALITY IMPLEMENTATION INFORMATION (web3tier)

| REQUIRED MODEL | REQUIRED FUNCTIONALITY | IMPLEMENTING FUNCTIONALITY | IMPLEMENTING PRODUCT |
|---|---|---|---|
| -- | rdb | -- | mysql |
| | | | c |
| | ap-svr | -- | d |
| | | | e |

401i FUNCTIONALITY IMPLEMENTATION INFORMATION (mail_web3tier)

| REQUIRED MODEL | REQUIRED FUNCTIONALITY | IMPLEMENTING FUNCTIONALITY | IMPLEMENTING PRODUCT |
|---|---|---|---|
| web3tier | rdb | -- | mysql |
| | | | c |
| | ap-svr | -- | d |
| | | | e |
| -- | mail-svr | -- | f |

Fig. 17

501d SYSTEM CONFIGURATION INFORMATION

| CONFIGURATION ID | MODEL | REQUIRED MODEL | REQUIRED FUNCTIONALITY | IMPLEMENTING FUNCTIONALITY | IMPLEMENTING PRODUCT | TEST CASE |
|---|---|---|---|---|---|---|
| 1 | web3tier | -- | rdb | -- | mysql | mysql_test |
|   |          |    | ap-svr | -- | d | d_test |
| 2 | web3tier | -- | rdb | -- | mysql | mysql_test |
|   |          |    | ap-svr | -- | e | e_test |
| 3 | web3tier | -- | rdb | -- | c | c_test |
|   |          |    | ap-svr | -- | d | d_test |
| 4 | web3tier | -- | rdb | -- | c | c_test |
|   |          |    | ap-svr | -- | e | e_test |
| 5 | mail_web3tier | web3tier | rdb | -- | mysql | mysql_test |
|   |               |          | ap-svr | -- | d | d_test |
|   |               |          | mail-svr | -- | f | f_test |
| 6 | mail_web3tier | web3tier | rdb | -- | mysql | mysql_test |
|   |               |          | ap-svr | -- | e | e_test |
|   |               |          | mail-svr | -- | f | f_test |
| 7 | mail_web3tier | web3tier | rdb | -- | c | c_test |
|   |               |          | ap-svr | -- | d | d_test |
|   |               |          | mail-svr | -- | f | f_test |
| 8 | mail_web3tier | web3tier | rdb | -- | c | c_test |
|   |               |          | ap-svr | -- | e | e_test |
|   |               |          | mail-svr | -- | f | f_test |

Fig. 20

401j FUNCTIONALITY IMPLEMENTATION INFORMATION (web3tier)

| REQUIRED MODEL | REQUIRED FUNCTIONALITY | IMPLEMENTING FUNCTIONALITY | IMPLEMENTING PRODUCT |
|---|---|---|---|
| -- | rdb | -- | mysql |
|  |  |  | c |
|  | ap-svr | -- | d |
|  |  |  | e |

401k FUNCTIONALITY IMPLEMENTATION INFORMATION (mail_web3tier)

| REQUIRED MODEL | REQUIRED FUNCTIONALITY | IMPLEMENTING FUNCTIONALITY | IMPLEMENTING PRODUCT |
|---|---|---|---|
| web3tier | rdb | -- | mysql |
|  |  |  | c |
|  | ap-svr | -- | d |
|  |  |  | e |
| -- | mail-svr | -- | f |

401l FUNCTIONALITY IMPLEMENTATION INFORMATION (batch)

| REQUIRED MODEL | REQUIRED FUNCTIONALITY | IMPLEMENTING FUNCTIONALITY | IMPLEMENTING PRODUCT |
|---|---|---|---|
| -- | cache-svr | -- | a |
|  | db | -- | b |
|  |  | rdb | mysql |
|  |  |  | c |

Fig. 21

501e SYSTEM CONFIGURATION INFORMATION

| CONFIGURATION ID | MODEL | REQUIRED MODEL | REQUIRED FUNCTIONALITY | IMPLEMENTING FUNCTIONALITY | IMPLEMENTING PRODUCT | TEST CASE |
|---|---|---|---|---|---|---|
| 1 | web3tier | — | rdb | — | mysql | mysql_test |
|   |          |   | ap-svr | — | d | d_test |
| 2 | web3tier | — | rdb | — | mysql | mysql_test |
|   |          |   | ap-svr | — | e | e_test |
| 3 | web3tier | — | rdb | — | c | c_test |
|   |          |   | ap-svr | — | d | d_test |
| 4 | web3tier | — | rdb | — | c | c_test |
|   |          |   | ap-svr | — | e | e_test |
| 5 | mail_web3tier | web3tier | rdb | — | mysql | mysql_test |
|   |               |          | ap-svr | — | d | d_test |
|   |               |          | mail-svr | — | f | f_test |
| 6 | mail_web3tier | web3tier | rdb | — | mysql | mysql_test |
|   |               |          | ap-svr | — | e | e_test |
|   |               |          | mail-svr | — | f | f_test |
| 7 | mail_web3tier | web3tier | rdb | — | c | c_test |
|   |               |          | ap-svr | — | d | d_test |
|   |               |          | mail-svr | — | f | f_test |
| 8 | mail_web3tier | web3tier | rdb | — | c | c_test |
|   |               |          | ap-svr | — | e | e_test |
|   |               |          | mail-svr | — | f | f_test |
| 9 | batch | — | cache-svr | — | a | a_test |
|   |       |   | db | rdb | b | b_test |
| 10 | batch | — | cache-svr | — | a | a_test |
|    |       |   | db | rdb | mysql | mysql_test |
| 11 | batch | — | cache-svr | — | a | a_test |
|    |       |   | db | rdb | c | c_test |

TEST SUPPORT DEVICE AND TEST SUPPORT METHOD

This application is a National Stage Entry of PCT/JP2013/007192 filed on Dec. 6, 2013, which claims priority from Japanese Patent Application 2012-270364 filed on Dec. 11, 2012, the contents of all of which are incorporated herein by reference, in their entirety.

TECHNICAL FIELD

The present invention relates to a test support device and a test support method.

BACKGROUND ART

In general, constructing a software system means arranging an environment in which plural and different pieces of middleware, which are installed or set, work cooperatively.

As a mechanism for constructing efficiently the environment, which makes the plural pieces of middleware work cooperatively, in a field of software development, a method of componentizing a software and linking the software components is known. As an example of the above-mentioned method, the object-orientation, the component-orientation and the like are exemplified. An art of applying the above-mentioned method to construction of a system which includes plural pieces of middleware is disclosed, for example, in NPL 1.

According to the art which is disclosed in NPL 1, a model (pattern) of a system is defined by a combination of products (components) each of which is a system component implementing some functionalities. For example, a model 'Web3Tier' is constructed by use of a product 'MySQL' or 'PostgreSQL' which implements functionality 'RDB', and a product 'Tomcat' or 'Jetty' which implements functionality 'AP-Server'. That is, as a combination of the products to construct the model 'Web3Tier', there are four patterns: 'MySQL' and 'Tomcat', 'MySQL' and 'Jetty', 'PostgreSQL' and 'Tomcat', and 'PostgreSQL' and 'Jetty'.

An art of carrying out efficient verification (test) of a system, which includes a combination of system components, is disclosed, for example, in PTL 1. According to the art which is disclosed in PTL 1, a test case for testing an operation of each component is prepared, and the test cases of components to construct the system are presented collectively as test cases which are necessary for testing the system.

CITATION LIST

Patent Literature

[PTL 1] Japanese Patent Application Laid-Open Publication No. 2011-118637

Non Patent Literature

[NPL 1] 'IBM Workload Deployer', International Business Machines Corporation, [online], [retrieved on Nov. 27, 2012], Internet <URL: http://www.redbooks.ibm.com/redbooks/SG248011/wwhelp/wwhimpl/js/ht ml/wwhelp.htm>

SUMMARY OF INVENTION

Technical Problem

However, according to the above-mentioned art which is described in PTL1, test cases, which are related to a configuration specified by a user or the like, is presented. Accordingly, when developing a specific system component, it is impossible to test comprehensively all configurations of a system which is related to the system component.

Therefore, there is a possibility that, while the system works normally by use of, for example, a combination of 'MySQL' and 'Tomcat', which is tested successfully, out of the above-mentioned combinations of products to construct the model 'Web3Tier', a problem may be caused in the system using a combination of 'MySQL' and 'Jetty' which is not tested.

In general, it is desirable that a developed system component is tested as quickly as possible at a time when the system component is developed. The reason is that, as a time when a problem is found in the developed component becomes delayed, the number of items to be considered about the developed component becomes increasing since dependencies of the developed component on peripheral components become increasing. Moreover, another reason is that it becomes difficult to modify the developed component since a developer forgets contents of the developed component.

Moreover, with respect to the test of the developed system component, it is desirable to test all configurations which are related to the developed component, comprehensively. The reason is that, in the case that a configuration, which has a small possibility of being selected, is not tested, a time when a problem of the configuration is found becomes delayed and consequently it becomes difficult to modify the developed component as mentioned above.

An object of the present invention is to solve the above-mentioned problem, and to provide a test support device and a test support method which can test all configurations of a system including a specific system component, comprehensively and quickly.

Solution to Problem

A test support device according to an exemplary aspect of the invention includes: when a configuration of a system is defined with a plurality of functionalities to be maintained by the system and a set of programs implementing the functionalities respectively, a storage means for storing relation information which indicates an identifier of each of one or more systems, an identifier of each of a plurality of functionalities to be maintained by each of the systems, and an identifier of each of one or more programs being capable of implementing each of the functionalities; and an extraction means for extracting, when a functionality or a program is specified, a configuration of a system including the specified functionality or the specified program on the basis of the relation information, and outputting the extracted configuration of a system.

A test support method according to an exemplary aspect of the invention includes: when a configuration of a system is defined with a plurality of functionalities to be maintained by the system and a set of programs implementing the functionalities respectively, storing relation information which indicates an identifier of each of one or more systems, an identifier of each of a plurality of functionalities to be maintained by each of the systems, and an identifier of each of one or more programs being capable of implementing each of the functionalities; and extracting, when a functionality or a program is specified, a configuration of a system including the specified functionality or the specified program on the basis of the relation information, and outputting the extracted configuration of a system.

A computer readable storage medium according to an exemplary aspect of the invention records thereon a program causing a computer to perform a method including: when a configuration of a system is defined with a plurality of functionalities to be maintained by the system and a set of programs implementing the functionalities respectively, storing relation information which indicates an identifier of each of one or more systems, an identifier of each of a plurality of functionalities to be maintained by each of the systems, and an identifier of each of one or more programs being capable of implementing each of the functionalities; and extracting, when a functionality or a program is specified, a configuration of a system including the specified functionality or the specified program on the basis of the relation information, and outputting the extracted configuration of a system.

Advantageous Effects of Invention

An advantageous effect of the present invention is that it is possible to test all configurations of the system including the specific system component, comprehensively and quickly.

BRIEF DESCRIPTION OF DRAWINGS

FIG. 8 is a diagram showing an example of component information 202 in the first exemplary embodiment of the present invention.

FIG. 9 is a diagram showing an example of test case information 301 in the first exemplary embodiment of the present invention.

FIG. 10 is a diagram showing an example of functionality implementation information 401 in the first exemplary embodiment of the present invention.

FIG. 11 is a diagram showing an example of system configuration information 501 in the first exemplary embodiment of the present invention.

FIG. 12 is a diagram showing another example of the functionality implementation information 401 in the first exemplary embodiment of the present invention.

FIG. 13 is a diagram showing another example of the system configuration information 501 in the first exemplary embodiment of the present invention.

FIG. 14 is a diagram showing another example of the functionality implementation information 401 in the first exemplary embodiment of the present invention.

FIG. 15 is a diagram showing another example of the system configuration information 501 in the first exemplary embodiment of the present invention.

FIG. 16 is a diagram showing another example of the functionality implementation information 401 in the first exemplary embodiment of the present invention.

FIG. 17 is a diagram showing another example of the system configuration information 501 in the first exemplary embodiment of the present invention.

FIG. 20 is a diagram showing an example of functionality implementation information 401 in the second exemplary embodiment of the present invention.

FIG. 21 is a diagram showing an example of system configuration information 501 in the second exemplary embodiment of the present invention.

DESCRIPTION OF EMBODIMENTS

First Exemplary Embodiment

A first exemplary embodiment of the present invention will be explained.

Figure 2:
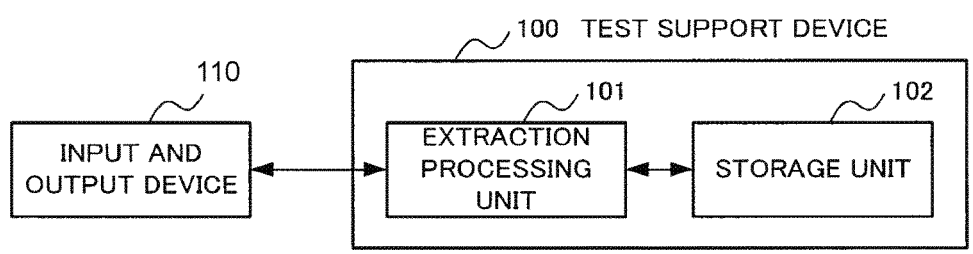
FIG. 2 is a block diagram showing a configuration of a test support device 100 in the first exemplary embodiment of the present invention.

Firstly, a configuration according to the first exemplary embodiment of the present invention will be explained. FIG. 2 is a block diagram showing a configuration of a test support device 100 in the first exemplary embodiment of the present invention.

With reference to FIG. 2, the test support device 100 of the first exemplary embodiment of the present invention includes an extraction processing unit (or extraction unit) 101 and a storage unit 102. The test support device 100 is communicatably connected with an input and output device 110 used by a user for inputting and outputting information, through a network or the like.

The extraction processing unit 101 receives an extraction request for extracting a system configuration, from the user through the input and output device 110. The extraction request includes specification of a component (target component) such as a system component added or updated, which is a target for testing influence on another component. Then, the extraction processing unit 101 extracts a system configuration including the target component, and outputs the extracted system configuration to the user through the input and output device 110.

The storage unit 102 stores component-relation information (or relation information) 201 and test case information 301. Here, the component-relation information 201 indicates a relation between each system component and another system component. The test case information 301 indicates a test case which is related to each system component.

In the first exemplary embodiment of the present invention, a product, functionality and a model are defined as the model component. Here, the product is a component which indicates an installation (a product) of a middleware. The functionality is a component which defines a concept abstracting a middleware. The model is a component which defines abstraction of a system combining middlewares. A model configuration of a model is determined by functionalities to be maintained by the model, and a set of products for implementing each of the functionalities.

Note that, to each system component (product, functionality and model), an identifier (product identifier (hereinafter, described as ID), functionality ID and model ID) which identifies the system component uniquely is assigned.

Figure 7:
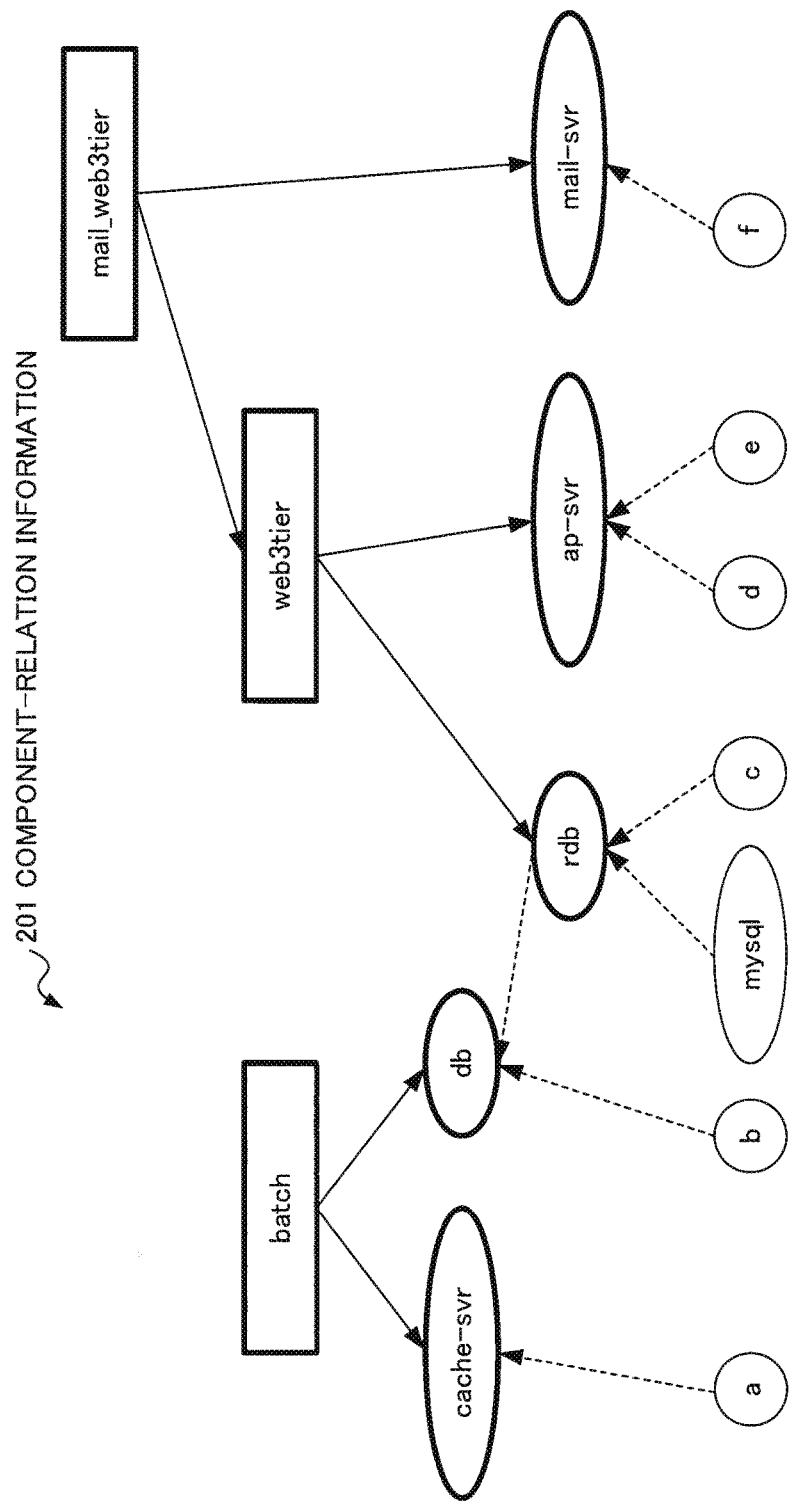
FIG. 7 is a diagram showing an example of component-relation information 201 in the first exemplary embodiment of the present invention.

FIG. 7 is a diagram showing an example of the component-relation information 201 in the first exemplary embodiment of the present invention. In FIG. 7, a square, a bold circle and a fine circle indicate a model, a functionality, and a product, respectively. A solid arrow indicates that a model at the start point of the arrow should maintain a functionality or a model at the end point of the arrow. A dotted arrow indicates that a product or a functionality at the start point of the arrow can implement a functionality at the end point of the arrow.

Here, with respect to the dotted arrow toward a functionality, a product at the start point of the dotted arrow is called an (directly) implementing product of the functionality. For example, in the component-relation information 201 shown in FIG. 7, a product 'mysql' is the implementing product of a functionality 'rdb'. One product may be an implementing product of plural different functionalities. One functionality may have plural different implementing products.

With respect to the dotted arrow toward a functionality, the other functionality at the start point of the dotted arrow is called an (directly) implementing functionality of the functionality. For example, in the component-relation information 201 shown in FIG. 7, the functionality 'rdb' is an implementing functionality of a functionality 'db'. One functionality may be an implementing functionality of other plural different functionalities. One functionality may have plural different implementing functionalities.

An implementing product of an implementing functionality of one functionality is also an (indirectly) implementing product of the one functionality. For example, in the component-relation information 201 shown in FIG. 7, the product 'mysql' is the implementing product of the functionality 'db'. as well as the implementing product of the functionality 'rdb'.

With respect to the solid arrow from a model, a functionality at the end point of the solid arrow is called a (directly) required functionality of the model. For example, in the component-relation information 201 shown in FIG. 7, the functionality 'rdb' is a required functionality of a model 'web3tier'. One functionality may be a required functionality of plural different models. One model may have plural different required functionalities.

With respect to the solid arrow from a model, the other model at the end point of the solid arrow is called a (directly) required model of the model. For example, in the component-relation information 201 shown in FIG. 7, the model 'web3tier' is the required model of a model 'mail_web3tier'. One model may be the required model of plural different models. One model may have plural different required models.

A required functionality of a required model of one model is corresponding to a (indirectly) required functionality of the one model. For example, in the component-relation information 201 shown in FIG. 7, the functionality 'rdb' is a required functionality of the model 'mail_web3tier' as well as a required functionality of the model 'web3tier'.

With respect to a required model of one model, another required model of the required model is also corresponding to a required model of the one model.

A system configuration of a model is determined by selecting one out of implementing products for each of all required functionalities of the model.

For example, a system configuration of the model 'mail_web3tier' is determined by selecting the product 'mysql' or 'c' regarding the functionality 'rdb', a product 'd' or 'e' regarding a functionality 'ap-svr (server)' and a product 'f' regarding a functionality 'mail-svr (server)'. Similarly, a system configuration of a model 'batch' is determined by selecting a product 'a' regarding a functionality 'cache-svr (server)' and a product 'b', 'mysql' or 'c' regarding the functionality 'db'.

The component-relation information 201 may be expressed by a set of pieces of component information 202 related to each component.

FIG. 8 is a diagram showing an example of the component information 202 in the first exemplary embodiment of the present invention.

The component information 202 includes component type which indicates a type of the component (product, functionality, and model).

In FIG. 8, component information 202a, component information 202b, and component information 202c are examples of the component information 202 which are related to a product, a functionality, and a model, respectively.

The component information 202a related to a product includes a product ID of the product, and a functionality ID of a functionality which uses the product as an (directly) implementing product. Moreover, the product, or a driver for installing or setting the product may be stored in an external storage unit (not shown in the drawing) in association with the product ID. According to the example shown in FIG. 8, the component information 202a indicates that the product 'mysql' is an implementing product of the functionality 'rdb'.

The component information 202b related to a functionality includes a functionality ID. The component information 202b may include a functionality ID of another functionality which uses the functionality as an (directly) implementing functionality. Moreover, a driver for abstracting products for implementing the functionality, that is, absorbing a difference between the products, or the like may be stored in the external storage unit (not shown in the drawing) in association with the functionality ID. According to the example shown in FIG. 8, the component information 202b indicates that the functionality 'rdb' is an implementing functionality of the functionality 'db'.

The component information 202c related to a model includes a model ID and a functionality ID of a (directly) required functionality of the model. The component information 202c may include a model ID of a (directly) required model of the model. Moreover, a driver for adjusting cooperation among products implementing plural required functionalities of the model, or the like may be stored in the external storage unit (not shown in the drawing) in association with the model ID. According to the example shown in FIG. 8, the component information 202c indicates that the required functionalities of the model 'web3tier' are the functionality 'rdb' and the functionality 'ap-svr'.

FIG. 9 is a diagram showing an example of the test case information 301 in the first exemplary embodiment of the present invention.

The test case information 301 includes an identifier of a test case (test case ID), and a test target which indicates an identifier of a component (product, functionality, and model) to be tested by the test case. Furthermore, the test case information 301 may include a command and a judgment condition used for checking normal installation of the product, and may include an installation of a sample program, its command, and its judgment condition used for checking normality of the functionality and the model, as test contents. The example shown in FIG. 9 indicates that a test case 'mysql_test' is a test case for testing a product 'mysql'. Moreover, as test contents, the example indicates that a command 'aptitude show mysql' is carried out, and a test result is judged to be normal if a response to the command is 'OK'.

The storage unit 102 stores the test case information 301 for each system component (product, functionality and model).

Here, the component information 202 and the test case information 301 may be expressed in a format of Extensible Markup Language (hereinafter, abbreviated as XML).

Alternatively, the component-relation information 201 and the test case information 301 may be stored in an external storage unit (not shown in the drawing), and an acquisition unit (not shown in the drawing) may acquire the component-relation information 201 and the test case information 301 from the external storage unit.

Note that the test support device 100 may be a computer that includes a CPU (Central Processing Unit) and a storage medium storing a program, and operates under the control based on the program.

Moreover, the test support device 100 may be connected with a system constructing device (not shown in the drawing) which constructs a system on a computer on the basis of a system configuration outputted by the test support device 100, and a test executing device (not shown in the drawing) which tests the system on the basis of the test case outputted by the test support device 100.

Figure 3:
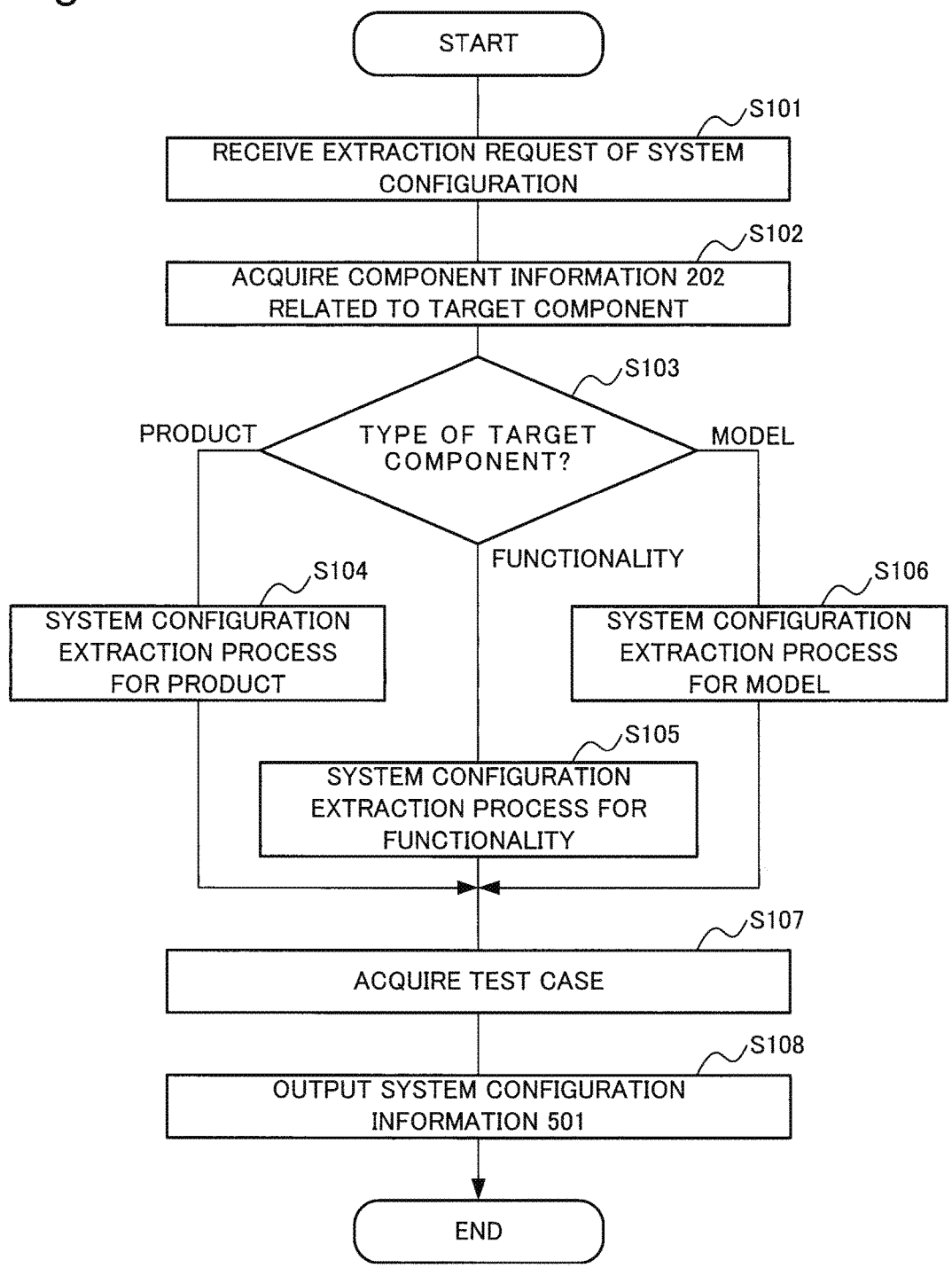
FIG. 3 is a flowchart showing processes carried out by the test support device 100 in the first exemplary embodiment of the present invention.

Next, an operation of the test support device 100 in the first exemplary embodiment of the present invention will be explained. FIG. 3 is a flowchart showing processes carried out by the test support device 100 in the first exemplary embodiment of the present invention.

Here, the operation will be explained with exemplifying a case that the component-relation information 201 shown in FIG. 7 is stored in the storage unit 102.

Firstly, the extraction processing unit 101 receives an extraction request for extracting a system configuration from a user through the input and output device 110 (Step S101). Here, the extraction request includes an identifier of a system component (target component) which is added or updated.

The extraction processing unit 101 acquires component information 202, which is related to the target component specified by the extraction request, from the storage unit 102 (Step S102).

The extraction processing unit 101 checks a type of the target component on the basis of a component type which is included in the acquired system component information 202 (Step 103).

In the case that the type of the target component is a product ("product" in Step S103), the extraction processing unit 101 carries out a system configuration extraction process for a product which will be mentioned later (Step S104).

In the case that the type of the target component is a functionality ("functionality" in Step S103), the extraction processing unit 101 carries out a system configuration extraction process for a functionality which will be mentioned later (Step S105).

In the case that the type of the target component is a model ("model" in Step S103), the extraction processing unit 101 carries out a system configuration extraction process for a model which will be mentioned later (Step S106).

By carrying out the system configuration extraction processes of Step S104 to Step S106, system configuration information 501, which indicates system configurations including the target component, is generated.

The extraction processing unit 101 acquires, for each component of each system configuration included in the system configuration information 501, a test case whose test target is the component, from test case information 301, and sets the acquired test case in the system configuration information 501 (Step S107).

The extraction processing unit 101 outputs the system configuration information 501 to the user through the input and output device 110 (Step S108).

Next, details of the system configuration extraction processes of Step S104 to Step S106 will be explained.

<System Configuration Extraction Process for a Product>

Firstly, details of the system configuration extraction process for a product (Step S104) will be explained.

Figure 4:
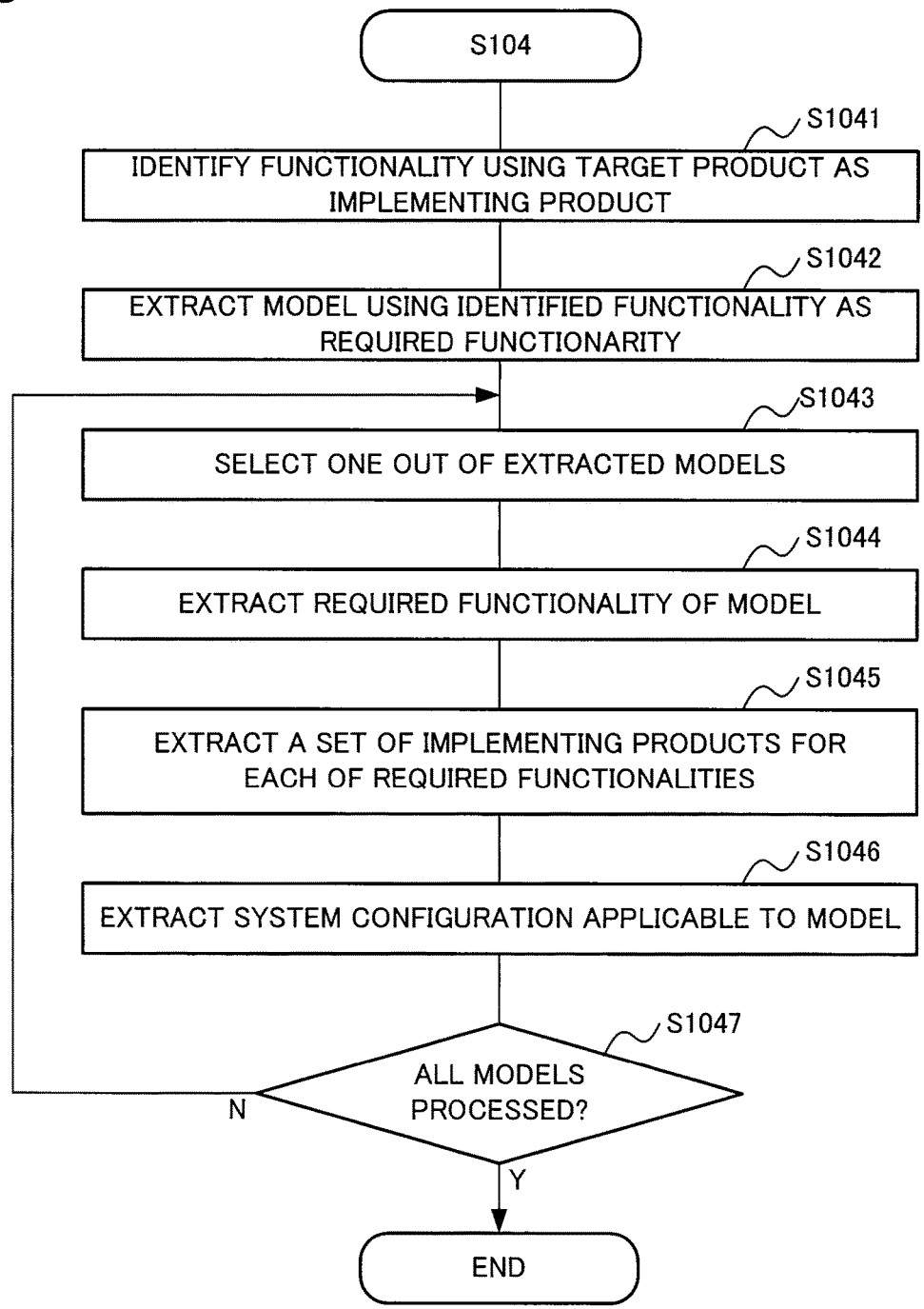
FIG. 4 is a flowchart showing details of a system configuration extraction process for a product (Step S104).

FIG. 4 is a flowchart showing the details of the system configuration extraction process for a product (Step S104) in the first exemplary embodiment of the present invention.

In the system configuration extraction process for a product, functionalities and models, for which the product being the target component (target product) causes influence, are extracted. Then, system configurations including the target product are extracted for the extracted models.

Firstly, the extraction processing unit 101 identifies functionalities using the target product as an implementing product on the basis of the component-relation information 201. The extraction processing unit 101 identifies the functionalities using the target product as an implementing product by exploring functionalities on all paths acquired by going forward along dotted arrows from the target product, recursively, in the component-relation information 201 (Step S1041).

For example, in the case that a product 'mysql' in the component-relation information 201 shown in FIG. 7 is specified as a target product, the extraction processing unit 101 identifies functionalities 'rdb' and 'db' as functionalities using the product 'mysql' as an implementing product.

Next, the extraction processing unit 101 extracts, for each of the functionalities identified in Step S1041, models using the functionality as a required functionality from the component-relation information 201.

The extraction processing unit 101 extracts the models using the identified functionality as a required functionality by exploring models on all paths acquired by going backward along solid arrows toward the identified functionality, recursively, in the component-relation information 201 (Step S1042).

For example, the extraction processing unit 101 extracts models 'web3tier' and 'mail_web3tier' as models using the functionality 'rdb' as a required functionality. The extraction processing unit 101 extracts a model 'batch' as a model using the functionality 'db' as a required functionality.

Next, the extraction processing unit 101 selects one out of the models extracted in Step S1042 (Step S1043). Here, the extraction processing unit 101 may select preferentially a model, which is near to the functionality identified in Step S1041, in the component-relation information 201.

The extraction processing unit 101 extracts required functionalities of the model selected in Step S1043, on the basis of the component-relation information 201. The extraction processing unit 101 extracts required models of the selected model by exploring required models on all paths acquired by going forward along solid arrow from the selected model, recursively, in the component-relation information 201.

Then, the extraction processing unit 101 extracts required functionalities of the selected model and each of the extracted required models (Step S1044).

For example, in the case that the model 'web3tier' is selected in Step S1043, the extraction processing unit 101 extracts the functionalities 'rdb' and 'ap-svr' as the required functionalities of the model 'web3tier'.

Next, the extraction processing unit 101 extracts, for each of the required functionalities extracted in Step S1044, a set of implementing products of the required functionality. The extraction processing unit 101 extracts implementing functionalities of the extracted required functionality by exploring functionalities on all paths acquired by going backward along dotted arrow toward the extracted required functionality, recursively, in the component-relation information 201. Then, the extraction processing unit 101 extracts implementing products of the extracted required functionality and the extracted implementing functionalities. The extraction processing unit 101 generates functionality implementation information 401 which indicates implementing products applicable to the model (Step S1045).

Note that, in the case that the required functionality extracted in Step 1044 is the functionality using the target product as the implementing product, which is identified in Step S1041, the extraction processing unit 101 extracts implementing functionalities in the component-relation information 201 as follows. That is, the extraction processing unit 101 extracts implementing functionalities by exploring functionalities only on a path between the extracted required functionality and the target product out of paths acquired by going backward along dotted arrows toward the extracted required functionality, recursively. In this case, the extraction processing unit 101 extracts only the target product as an implementing product.

Each of FIG. 10, FIG. 12, FIG. 14 and FIG. 16 is a diagram showing an example of the functionality implementation information 401 in the first exemplary embodiment of the present invention. The functionality implementation information 401 includes a set of a model ID of a required model, a functionality ID of a required functionality, extracted for a model, and a functionality ID of an implementing functionality, a product ID of an implementing product, extracted for the required functionality.

For example, since the functionality 'rdb' out of the extracted required functionalities is a functionality using the target product 'mysql' as an implementing product, the extraction processing unit 101 extracts the implementing product 'mysql' for the functionality 'rdb'. The extraction processing unit 101 extracts implementing products 'd' and 'e' for the functionality 'ap-svr'. As a result, the extraction processing unit 101 generates functionality implementation information 401a shown in FIG. 10 for the model 'web3tier'.

Note that, in the case that functionality implementation information 401 for the required model of the model selected in Step S1043 has been generated already, the extraction processing unit 101 may use contents of the generated functionality implementation information 401.

Next, the extraction processing unit 101 extracts system configurations applicable to the model on the basis of a set of implementing products for each of the required functionalities extracted in Step S1045. Here, the extraction processing unit 101 extracts system configurations by calculating directly product between the sets of the implementing products for the required functionalities and acquiring a combination of the implementing products. Then, the extraction processing unit 101 sets the acquired system configurations in the system configuration information 501 (Step S1046).

Each of FIG. 11, FIG. 13, FIG. 15 and FIG. 17 is a diagram showing an example of the system configuration information 501 in the first exemplary embodiment of the present invention. The system configuration information 501 includes an identifier for identifying a system configuration (configuration ID), a model ID of a model, a model ID of a required model, and a functionality ID of a required functionality extracted for the model. Furthermore, the system configuration information 501 includes a functionality ID of an implementing functionality and a product ID of an implementing product extracted for the required functionality, and a test case ID of a test case which is used for testing the implementing product.

For example, the extraction processing unit 101 calculates directly product between a set of implementing product {'mysql'} for the required functionality 'rdb' and a set of implementing products {'d', 'e'} for the required functionality 'ap-svr'. As a calculation result of the directly product, combinations of the implementing products, that is, {'mysql', 'd'} and {'mysql', 'e'} are acquired. The extraction processing unit 101 acquires model IDs of the model and the required model, functionality IDs of the required functionality and the implementing functionality, and product ID of the implementing product from the functionality implementation information 401 shown in FIG. 10 regarding these combinations, and sets system configurations having configuration IDs '1' and '2' shown in system configuration information 501a of FIG. 11.

The extraction processing unit 101 repeats Steps S1043 to S1046 for each of the models extracted in Step S1042 (Step S1047).

For example, in the case that the model 'mail_web3tier' is selected in Step S1043, the extraction processing unit 101 extracts the model 'web3tier' as a required model of the model 'mail_web3tier', and extracts the functionality 'rdb', the functionality 'ap-svr', and the functionality 'mail-svr' as required functionalities of the model 'mail_web3tier'.

The extraction processing unit 101 extracts the implementing product 'mysql' for the functionality 'rdb' out of the extracted required functionalities, and extracts the implementing products 'd' and 'e' for the functionality 'ap-svr', similarly to the above. Furthermore, the extraction processing unit 101 extracts an implementing product 'f' for the functionality 'mail-svr'. As a result, the extraction processing unit 101 generates functionality implementation information 401b shown in FIG. 10 for the model 'mail_web3tier'.

The extraction processing unit 101 calculates directly product among a set of the implementing product {'mysql'} for the required functionality 'rdb', a set of the implementing products {'d', 'e'} for the required functionality 'ap-svr', and a set of the implementing product {'f'} for the required functionality 'mail-svr'. As a calculation result of the directly product, combinations of the implementing products, that is, {'mysql', 'd', 'f'} and {'mysql', 'e', 'f'} are acquired. The extraction processing unit 101 sets system configurations having configuration IDs '3' and '4' shown in the system configuration information 501a of FIG. 11, for these combinations.

Moreover, in the case that the model 'batch' is selected in Step S1043, the extraction processing unit 101 extracts a functionality 'cache-svr' and the functionality 'db' as required functionalities of the model 'batch'.

Then, the extraction processing unit 101 extracts an implementing product 'a' for the functionality 'cache-svr' out of the extracted required functionalities. Moreover, since the functionality 'db' is a functionality using the target product 'mysql' as an implementing product, the extraction processing unit 101 extracts the implementing functionality 'rdb' and the implementing product 'mysql' for the functionality 'mail-svr'. As a result, the extraction processing unit 101 generates functionality implementation information 401*c* shown in FIG. 10 for the model 'batch'.

The extraction processing unit 101 calculates directly product between a set of the implementing product {'a'} for the required functionality 'cache-svr' and a set of the implementing product {'mysql'} for the required functionality 'db'. As a calculation result of the directly product, a combination of the implementing products, that is, {'a', 'mysql'} is acquired. The extraction processing unit 101 sets a system configuration having a configuration ID '5' shown in the system configuration information 501*a* of FIG. 11, for the combination.

Then, on the basis of the test case information 301 shown in FIG. 9, the extraction processing unit 101 sets a test case 'mysql_test' as a test case for the implementing product 'mysql' which is shown in the system configuration information 501*a* of FIG. 11. The extraction processing unit 101 sets test cases for other implementing products as shown in FIG. 11.

As another example, in the case that the product 'a' shown in the component-relation information 201 of FIG. 7 is specified as a target product, the extraction processing unit 101 identifies the functionality 'cache-svr' as a functionality using the product 'a' as an implementing product.

The extraction processing unit 101 extracts 'batch' as a model using the functionality 'cache-svr' as a required functionality.

The extraction processing unit 101 extracts the functionality 'cache-svr' and the functionality 'db' as required functionalities of the model 'batch'.

Since the functionality 'cache-svr' out of the extracted required functionalities is a functionality using the target product 'a' as an implementing product, the extraction processing unit 101 extracts the implementing product 'a' for the functionality 'cache-svr'. The extraction processing unit 101 extracts an implementing product 'b', the implementing functionality 'rdb', and the implementing products 'mysql' and 'c' for the functionality 'db'. As a result, the extraction processing unit 101 generates function implementation information 401*d* shown in FIG. 12 for the model 'batch'.

The extraction processing unit 101 calculates directly product between a set of the implementing product {'a'} for the required functionality 'cache-svr' and a set of the implementing products {'b', 'mysql', 'c'} for the required functionality 'db'. As a calculation result of the directly product, combinations of the implementing products, that is, {'a', 'b'}, {'a', 'mysql'} and {'a', 'c'} are acquired. The extraction processing unit 101 sets system configurations having configuration IDs '1', '2', and '3' shown in system configuration information 501*b* of FIG. 13, for the combinations.

<System Configuration Extraction Process for a Functionality>

Next, details of the system configuration extraction process for a functionality (Step S105) will be explained.

Figure 5:
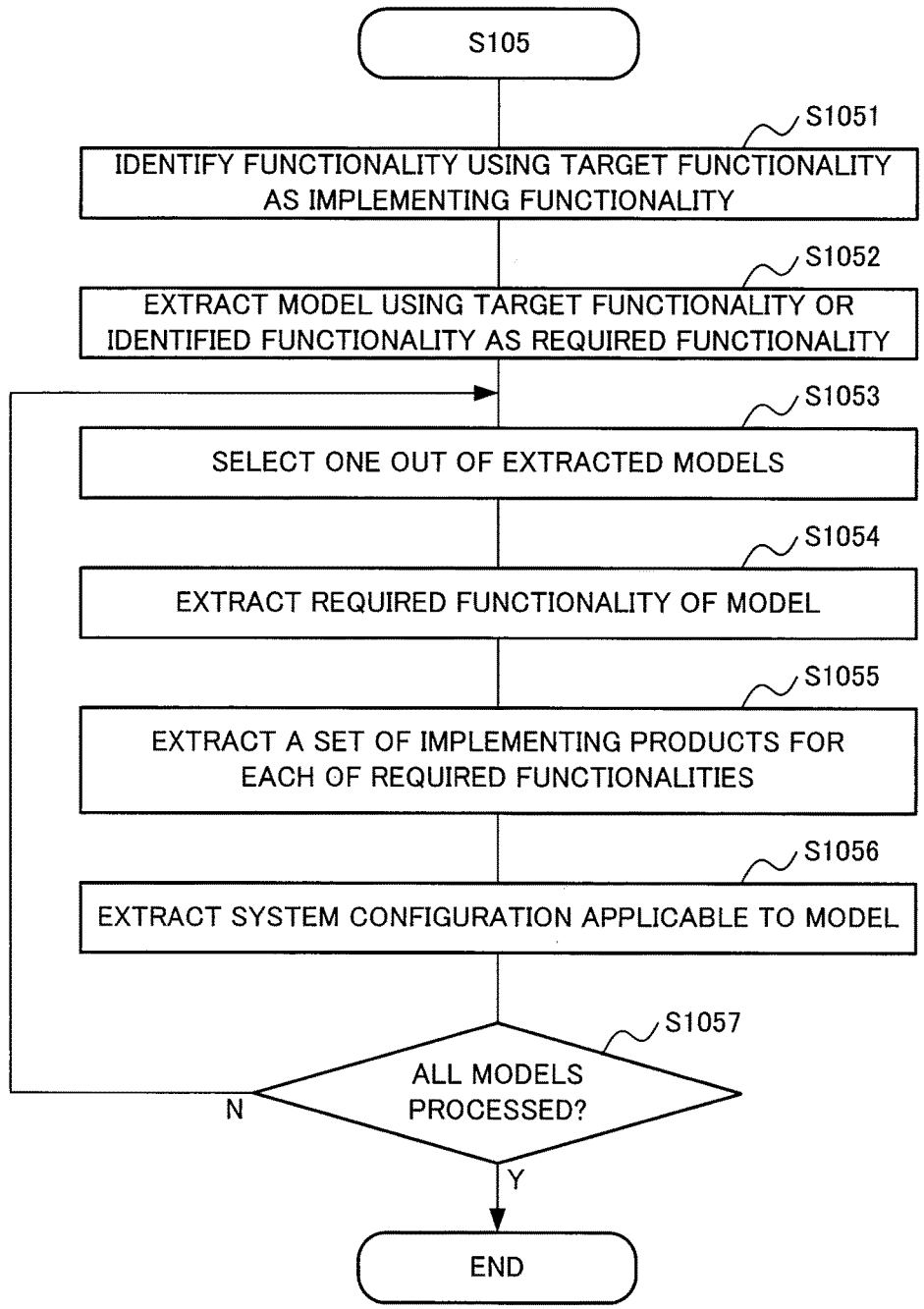
FIG. 5 is a flowchart showing details of a system configuration extraction process for a functionality (Step S105).

FIG. 5 is a flowchart showing the details of the system configuration extraction process for a functionality (Step S105) in the first exemplary embodiment of the present invention.

In the system configuration extraction process for a functionality, functionalities and models, for which the functionality being the target component (target functionality) causes influence, are extracted. Then, system configurations including the target functionality are extracted for the extracted models.

Firstly, the extraction processing unit 101 identifies functionalities using the target functionality as an implementing functionality on the basis of the component-relation information 201. The extraction processing unit 101 identifies the functionalities using the target functionality as an implementing functionality by exploring functionalities on all paths acquired by going forward along dotted arrows from the target functionality, recursively, in the component-relation information 201 (Step S1051).

For example, in the case that a functionality 'rdb' in the component-relation information 201 shown in FIG. 7 is specified as a target functionality, the extraction processing unit 101 identifies a functionality 'db' as a functionality using the functionality 'rdb' as an implementing functionality.

Next, similarly to Step S1042, the extraction processing unit 101 extracts, for each of the target functionality and the functionalities identified in Step S1051, models using the functionality as a required functionality (Step S1052).

For example, the extraction processing unit 101 extracts models 'web3tier' and 'mail_web3tier' as models using the functionality 'rdb' as a required functionality. The extraction processing unit 101 extracts a model 'batch' as a model using the functionality 'db' as a required functionality.

Next, the extraction processing unit 101 selects one out of the models extracted in Step S1052 (Step S1053).

The extraction processing unit 101 extracts required functionalities of the model selected in Step S1053, similarly to Step S1044 (Step S1054).

For example, in the case that the model 'web3tier' is selected in Step S1043, the extraction processing unit 101 extracts the functionalities 'rdb' and 'ap-svr' as the required functionalities of the model 'web3tier'.

Next, the extraction processing unit 101 extracts, for each of the required functionalities extracted in Step S1054, a set of implementing products of the required functionality, similarly to Step S1045 (Step S1055).

Note that, in the case that the required functionality extracted in Step S1054 is the functionality using the target functionality as the implementing functionality, which is identified in Step S1051, the extraction processing unit 101 extracts implementing functionalities in the component-relation information 201 as follows. That is, the extraction processing unit 101 extracts implementing functionalities by exploring functionalities only on a path between the extracted required functionality and the target functionality out of paths acquired by going backward along the dotted arrows toward the extracted required functionality, recursively.

For example, the extraction processing unit 101 extracts implementing products 'mysql' and 'c' for the functionality 'rdb' out of the extracted required functionalities. Similarly, the extraction processing unit 101 extracts the implementing products 'd' and 'e' for the functionality 'ap-svr'. As a result, the extraction processing unit 101 generates functionality implementation information 401*e* shown in FIG. 14 for the model 'web3tier'.

Next, the extraction processing unit 101 extracts system configurations applicable to the model, similarly to Step S1046.

For example, the extraction processing unit 101 calculates directly product between a set of the implementing products {'mysql', 'c'} for the required functionality 'rdb', and a set of the implementing products {'d', 'e'} for the required functionality 'ap-svr'. As a calculation result of the directly product, combinations of the implementing products, that is, {'mysql', 'd'}, {'mysql', 'e'}, {'c', 'd'}, and {'c', 'e'} are acquired. The extraction processing unit 101 sets system configurations having configuration IDs '1', '2', '3', and '4' shown in system configuration information 501c of FIG. 15, for these combinations.

The extraction processing unit 101 repeats Steps S1053 to S1056 for all models extracted in Step 1052 (Step S1057).

For example, in the case that the model 'mail_web3tier' is selected in Step S1053, the extraction processing unit 101 extracts the model 'web3tier' as the required model of the model 'mail_web3tier' and, extracts the functionalities 'rdb', 'ap-svr', and a functionality 'mail-svr' as required functionalities of the model 'mail_web3tier'.

The extraction processing unit 101 extracts the implementing products 'mysql' and 'c' for the functionality 'rdb' out of the extracted required functionalities, and extracts implementing products 'd' and 'e' for the functionality 'ap-svr', similarly to the above. The extraction processing unit 101 extracts an implementing product 'f' for the functionality 'mail-svr'. As a result, the extraction processing unit 101 generates functionality implementation information 401f shown in FIG. 14 for the model 'mail_web3tier'.

The extraction processing unit 101 calculates directly product among a set of the implementing products {'mysql', 'c'} for the required functionality 'rdb', a set of the implementing products {'d', 'e'} for the required functionality 'ap-svr', and a set of the implementing product {'f'} for the required functionality 'mail-svr'. As a calculation result of the directly product, combinations of the implementing products, that is, {'mysql', 'd', 'f'}, {'mysql', 'e', 'f'}, {'c', 'd', 'f'} and {'c', 'e', 'f'} are acquired. The extraction processing unit 101 sets system configurations having configuration IDs '5', '6', '7', and '8' shown in the system configuration information 501c of FIG. 15, for these combinations.

Moreover, in the case that the model 'batch' is selected in Step S1053, the extraction processing unit 101 extracts a functionality 'cache-svr' and the functionality 'db' as required functionalities for the model 'batch'.

Then, the extraction processing unit 101 extracts an implementing product 'a' for the functionality 'cache-svr' out of the extracted required functionalities. Moreover, since the functionality 'db' is a functionality using the target functionality 'rdb' as an implementing functionality, the extraction processing unit 101 extracts the implementing functionality 'rdb' and the implementing products 'mysql', 'c' for the functionality 'db'. As a result, the extraction processing unit 101 generates function implementation information 401g shown in FIG. 14 for the model 'batch'.

The extraction processing unit 101 calculates directly product between a set of the implementing product {'a'} for the required functionality 'cache-svr' and a set of the implementing products {'mysql', 'c'} for the required functionality 'db'. As a calculation result of the directly product, combinations of the implementing products, that is, {'a', 'mysql'} and {'a', 'c'} are acquired. The extraction processing unit 101 sets system configurations having configuration IDs '9' and '10' shown in the system configuration information 501c of FIG. 15, for these combinations.

<System Configuration Extraction Process for a Model>

Next, details of the system configuration extraction process for a model (Step S106) will be explained.

Figure 6:
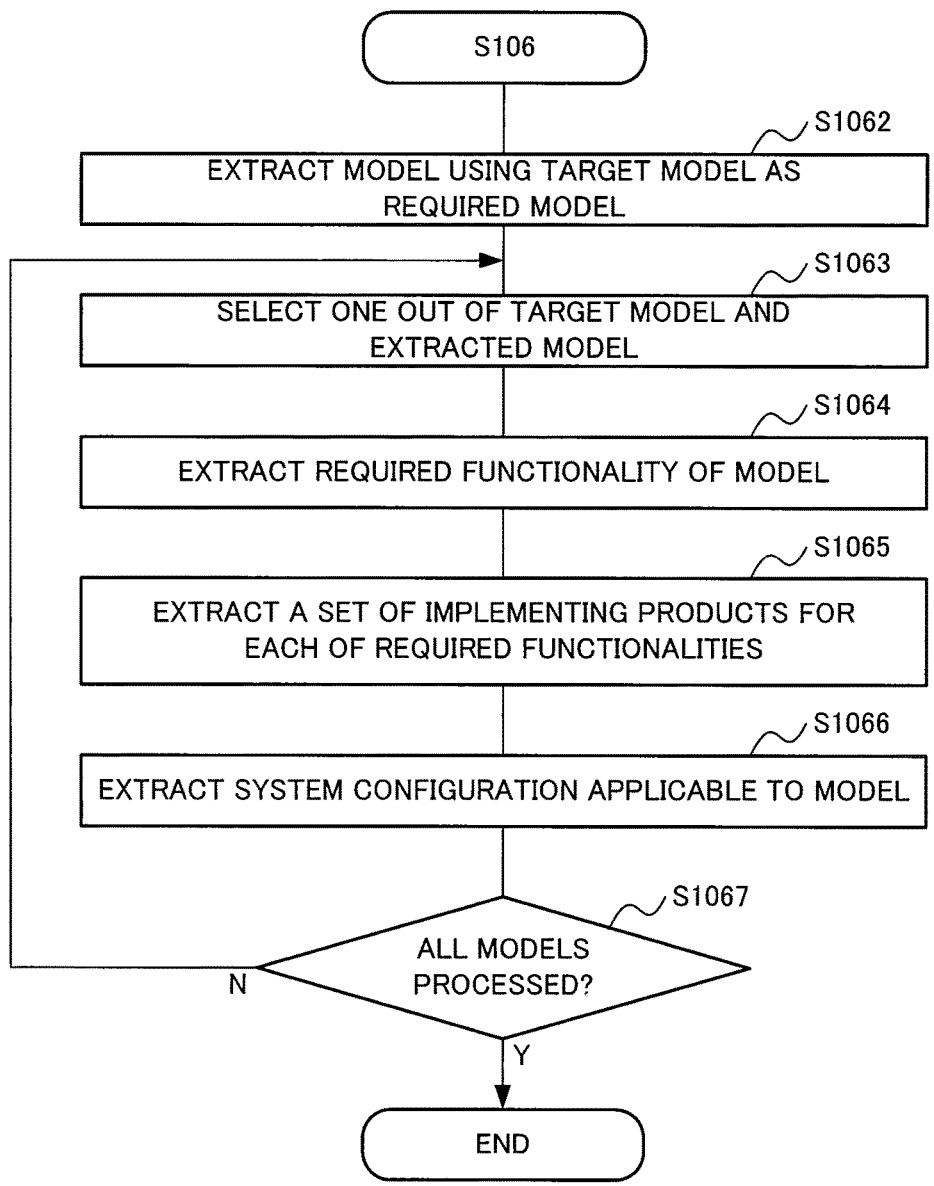
FIG. 6 is a flowchart showing details of a system configuration extraction process for a model (Step S106).

FIG. 6 is a flowchart showing the details of the system configuration extraction process for a model (Step S106) in the first exemplary embodiment of the present invention.

In the system configuration extraction process for a model, functionalities and models, for which the model being the target component (target model) causes influence, are extracted. Then, system configurations including the target model are extracted for the extracted models.

Firstly, the extraction processing unit 101 extracts models using the target model as a required model on the basis of the component-relation information 201. The extraction processing unit 101 extracts the models using the target model as a required model by exploring models on all paths acquired by going backward along solid arrows toward the target model, recursively, in the component-relation information 201 (Step S1062).

For example, in the case that the model 'web3tier' in the component-relation information 201 shown in FIG. 7 is specified as a target model, the extraction processing unit 101 extracts a model 'mail_web3tier' as a model using the model 'web3tier' as a required model.

Next, the extraction processing unit 101 selects one out of the target model and the models extracted in Step S1062 (Step S1063).

The extraction processing unit 101 extracts required functionalities of the model selected in Step S1063, similarly to Step S1044 (Step S1064).

For example, in the case that the model 'web3tier' is selected in Step S1043, the extraction processing unit 101 extracts functionalities 'rdb' and 'ap-svr' as required functionalities of the model 'web3tier'.

Next, the extraction processing unit 101 extracts, for each of the required functionalities extracted in Step S1064, a set of implementing products for the required functionality, similarly to Step S1045 (Step S1065).

For example, the extraction processing unit 101 extracts implementing products 'mysql' and 'c' for the functionality 'rdb' out of the extracted functionalities. Similarly, the extraction processing unit 101 extracts implementing products 'd' and 'e' for the functionality 'ap-svr'. As a result, the extraction processing unit 101 generates functionality implementation information 401h shown in FIG. 16 for the model 'web3tier'.

Next, the extraction processing unit 101 extracts system configurations applicable to the model, similarly to Step S1046 (Step S1066).

For example, the extraction processing unit 101 calculates directly product between a set of the implementing products {'mysql', 'c'} for the required functionality 'rdb' and a set of the implementing products {'d', 'e'} for the required functionality 'ap-svr'. As a calculation result of the directly product, combinations of the implementing products, that is, {'mysql', 'd'}, {'mysql', 'e'}, {'c', 'd'}, and {'c', 'e'} are acquired. The extraction processing unit 101 sets system configurations having configuration IDs '1', '2', '3', and '4' shown in system configuration information 501d of FIG. 17, for these combinations.

The extraction processing unit 101 repeats Steps S1063 to S1066 for the target model and all models extracted in Step S1062 (Step S1067).

For example, in the case that the model 'mail_web3tier' is selected in Step S1063, the extraction processing unit 101 extracts the model 'web3tier' as a required model of the model 'mail_web3tier', and extracts the functionalities 'rdb', 'ap-svr' and a functionality 'mail-svr' as required functionalities of the model 'mail_web3tier'.

The extraction processing unit 101 extracts the implementing products 'mysql' and 'c' for the functionality 'rdb', and extracts the implementing products 'd' and 'e' for the functionality 'ap-svr', similarly to the above. Moreover, the extraction processing unit 101 extracts an implementing product 'f' for the functionality 'mail-svr'. As a result, the extraction processing unit 101 generates functionality implementation information 401i shown in FIG. 16 for the model 'mail_web3tier'.

The extraction processing unit 101 calculates directly product among a set of the implementing products {'mysql', 'c'} for the required functionality 'rdb', a set of the implementing products {'d', 'e'} for the required functionality 'ap-srv', and a set of the implementing product {'f'} for the required functionality 'mail-svr'. As a calculation result of the directly product, combinations of the implementing products, that is, {'mysql', 'd', 'f'}, {'mysql', 'e', 'f'}, {'c', 'd', 'f'}, and {'c', 'e', 'f'} are acquired. The extraction processing unit 101 sets system configurations having configuration IDs '5', '6', '7', and '8' shown in the system configuration information 501d of FIG. 17, for these combinations.

By carrying out the above, the operation of the first exemplary embodiment of the present invention has been completed.

Figure 1:
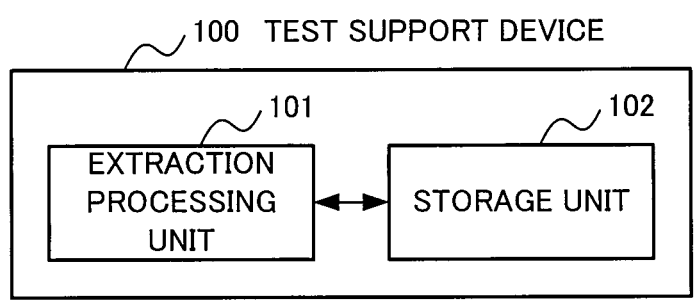
FIG. 1 is a block diagram showing a characteristic configuration of a first exemplary embodiment of the present invention.

Next, a characteristic configuration of the first exemplary embodiment of the present invention will be described. FIG. 1 is a block diagram showing the characteristic configuration of the first exemplary embodiment of the present invention.

Referring to FIG. 1, a test support device 100 includes a storage unit 102 and an extraction processing unit 101. Here, a configuration of a system is defined with a plurality of functionalities to be maintained by the system and a set of programs implementing the functionalities respectively. The storage unit 102 stores component-relation information 201 which indicates an identifier of each of one or more systems, an identifier of each of a plurality of functionalities to be maintained by each of the systems, and an identifier of each of one or more programs being capable of implementing each of the functionalities. The extraction processing unit 101 extracts, when a functionality or a program is specified, a configuration of a system including the specified functionality or the specified program on the basis of the component-relation information 201, and outputs the extracted configuration of a system.

According to the first exemplary embodiment of the present invention, it is possible to test all configurations of a system including a specific system component, comprehensively and quickly. The reason is that, in the case that a functionality or a program is specified, the extraction processing unit 101 extracts a configuration of a system including the specified functionality or the specified program on the basis of the component-relation information 201, and outputs the extracted configuration of a system. Consequently, it is possible to reduce workload required for testing at a time of adding or updating the system component, and furthermore it is possible to completely test the system configurations in which the system component is added or updated.

Moreover, according to the first exemplary embodiment of the present invention, it is possible to easily acquire test cases, which are required for testing all system configurations including the specific system component. The reason is that the extraction processing unit 101 extracts identifiers of the test cases, which are related to each of functionalities and each of programs included in the extracted system configuration, from the test case information 301, and outputs the extracted identifiers of the test cases.

Moreover, according to the first exemplary embodiment of the present invention, it is possible to carry out the automatic test of all system configurations including the specific system component. The reason is that a system construction device can construct a system on the basis of the system configuration extracted by the extraction processing unit 101, and a test execution device can test the system on the basis of the test cases extracted by the extraction processing unit 101.

Second Exemplary Embodiment

Next, a second exemplary embodiment of the present invention will be explained.

The second exemplary embodiment of the present invention is different from the first exemplary embodiment of the present invention in a point that, after generating system configurations which are applicable to all model included in the component-relation information 201, the extraction processing unit 101 extracts a system configuration which includes the target component.

A configuration of the test support device 100 in the second exemplary embodiment of the present invention is the same as that in the first exemplary embodiment of the present invention.

Figure 18:
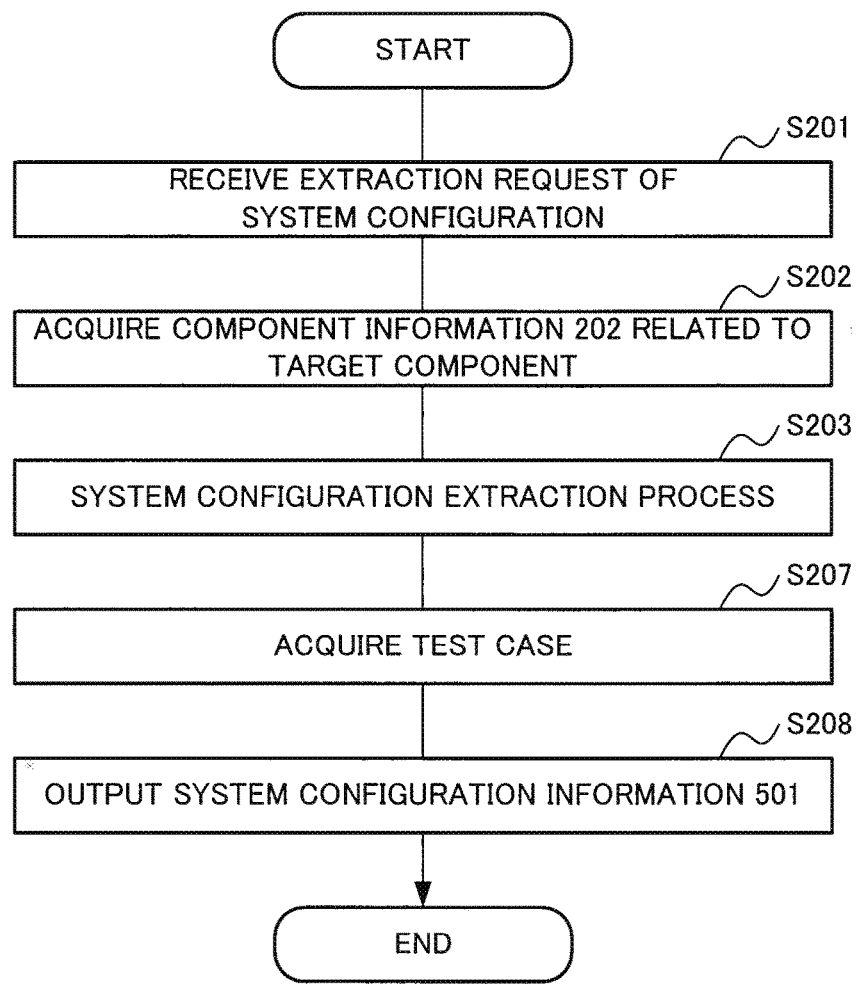
FIG. 18 is a flowchart showing processes carried out by a test support device 100 in a second exemplary embodiment of the present invention.

Next, an operation of the test support device 100 in the second exemplary embodiment of the present invention will be explained. FIG. 18 is a flowchart showing processes carried out by the test support device 100 in the second exemplary embodiment of the present invention Similarly to the first exemplary embodiment of the present invention, the operation will be explained with exemplifying a case that the component-relation information 201 shown in FIG. 7 is stored in the storage unit 102.

In FIG. 18, processes up to acquiring the component information 202 related to the target component and processes from acquiring the test case (Steps S201 to S202 and Steps S207 to S208) are the same as Steps S101 to S102 and Steps S107 to S208 in the first exemplary embodiment of the present invention.

The extraction processing unit 101 carries out a system configuration extraction process (Step S203) explained later regardless of a type of a target component.

Next, details of the system configuration extraction process in Step S203 will be explained.
<System Configuration Extraction Process>

Figure 19:
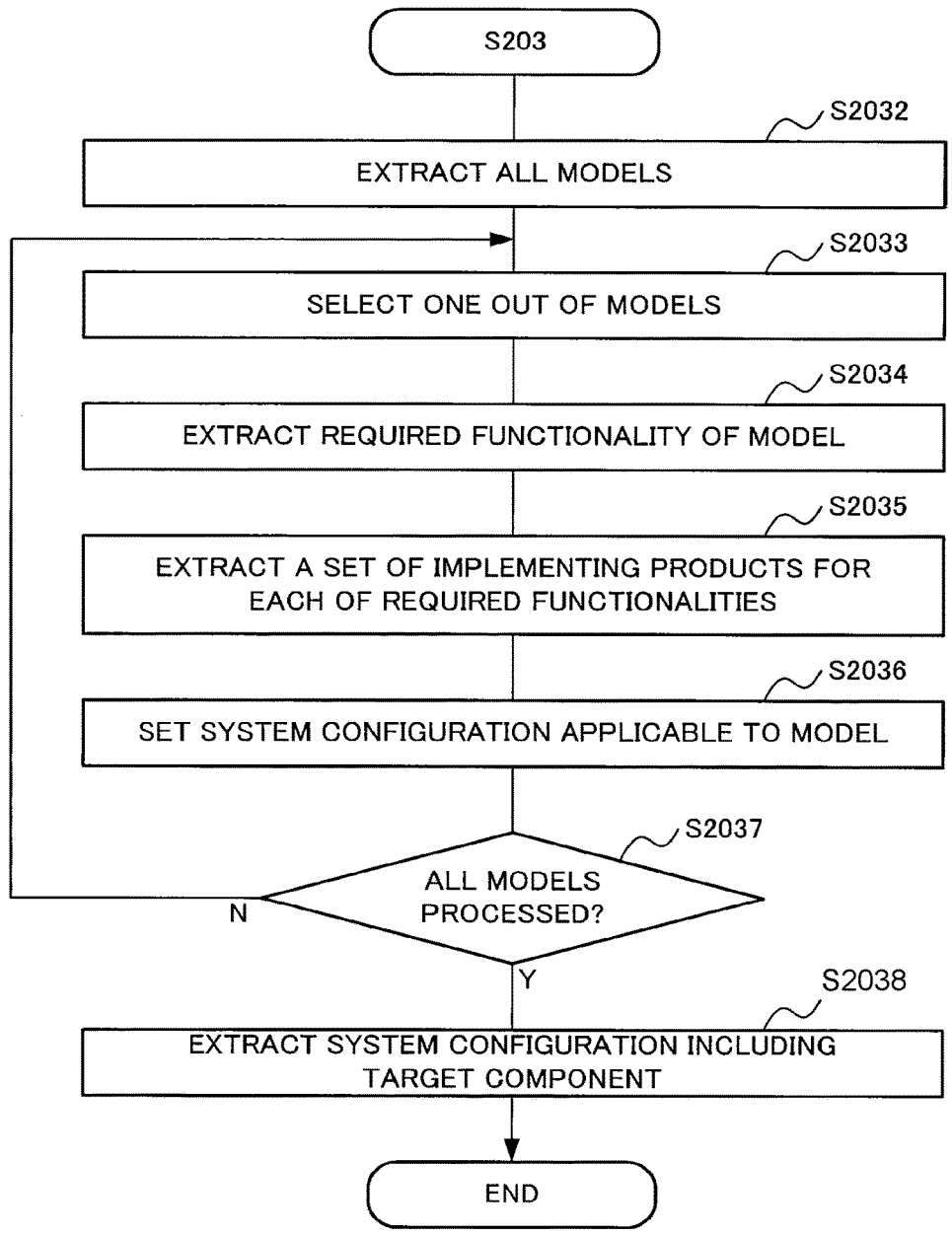
FIG. 19 is a flowchart showing details of a system configuration extraction process (Step S203) in the second exemplary embodiment of the present invention.

FIG. 19 is a flowchart showing the details of the system configuration extraction process (Step S203) in the second exemplary embodiment of the present invention.

In the system configuration extraction process of the second exemplary embodiment of the present invention, for each of all models included in the component-relation information 201, a system configuration applicable to the model is generated. Then, a system configuration including the target component is extracted out of the extracted system configurations.

Firstly, the extraction processing unit 101 extracts all models included in the component-relation information 201 (Step S2032).

Next, the extraction processing unit 101 selects one out of the models extracted in Step S2032 (Step S2033).

The extraction processing unit 101 extracts required functionalities of the model selected in Step S2033, similarly to Step S1044 (Step S2034).

Next, the extraction processing unit 101 extracts a set of implementing products for each of the required functionalities extracted in Step S2034, similarly to Step S1045 (Step S2035).

Next, the extraction processing unit 101 sets system configurations applicable to the model, similarly to Step S1046 (Step S2036).

The extraction processing unit 101 repeats Steps S2033 to S2036 for the target model and all models which extracted in Step S2032 (Step S2037).

FIG. 20 is a diagram showing an example of the functionality implementation information 401 in the second exemplary embodiment of the present invention. FIG. 21 is a diagram showing an example of the system configuration information 501 in the second exemplary embodiment of the present invention.

For example, the extraction processing unit 101 generates functionality implementation information 401*j*, 401*k* and 401*l* for the models 'web3tier', 'mail_web3tier' and 'batch', respectively, which are included in the component-relation information 201 shown in FIG. 7. Then, the extraction processing unit 101 sets system configurations shown in system configuration information 501*e* of FIG. 21.

Finally, the extraction processing unit 101 extracts system configurations including the target component out of the system configurations included in the system configuration information 501 (Step S2038).

For example, in the case that the product 'mysql' in the component-relation information 201 shown in FIG. 7 is specified as a target component, the extraction processing unit 101 extracts system configurations including the product 'mysql' as an implementing product, taht is, system configurations having configuration IDs '1', '2', '5', '6', and '10', out of the system configurations included in the system configuration information 501*e* shown in FIG. 21.

By carrying out the above, the operation of the second exemplary embodiment of the present invention has been completed.

According to the second exemplary embodiment of the present invention, it is possible to test all configurations of a system including a specific system component, comprehensively and quickly, similarly to the first exemplary embodiment of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-270364, filed on Dec. 11, 2012, the disclosure of which is incorporated herein in its entirety by reference.

REFERENCE SIGNS LIST 100 test support device
101 extraction processing unit
102 storage unit
110 input and output device
201 component-relation information
202 component information
301 test case information
401 functionality implementation information
501 system configuration information

What is claimed is:

1. A test support device comprising:
a memory storing instructions; and
one or more processors configured to execute the instructions to:
receive a request for a system configuration including a specified product;
store relation information indicating an identifier of each of one or more models, an identifier of each of a plurality of functionalities to be maintained by each model, and an identifier of each of one or more products capable of implementing each functionality, a configuration of each model defined by the plurality of functionalities maintained by the model and the products capable of implementing each functionality;
identify a functionality implemented by the specified product, from the relation information;
extract a set of extracted models that maintain the identified functionality, from the relation information;
generate a set of test cases for the extracted models and a set of configurations for the extracted models, for each extracted model of the set of extracted models, including instructions to:
extract a set of functionalities to be maintained by the extracted model, from the relation information;
generate, for each extracted functionality of the set of extracted functionalities, a set of implementing products capable of implementing the extracted functionality, from the relation information; and
extract a configuration of the extracted model, as one of the set of configurations, by calculating directly product between the sets of implementing products generated for the extracted functionalities, from the relation information;
store test case information including an identifier of a test case related to the extracted model, as one of the set of test cases, from the relation information; and
output the identifier of the test case related to the extracted model;
construct a set of systems, each system configured in accordance with a corresponding configuration of the set of configurations; and
test the set of systems, each system tested based on a corresponding test case having the outputted identifier of the set of test cases.

2. The test support device according to claim 1, wherein the relation information optionally stores an identifier of each of a plurality of higher functionalities to be maintained by respective ones of the models, stores an identifier of each of a plurality of lower functionalities which implement the higher functionality, and stores an identifier each of one or more products to be maintained by the lower functionality, and the one or more processors are further configured to execute the instructions to:
when identifying the functionality implemented by the specified product, identify a functionality implemented by the specified product and identify a higher functionality implemented by the identified functionality, recursively;
when extracting the set of extracted models, identify the set of models that implement the identified functionality and the higher functionality; and
when extracting the set of functionalities to be maintained by the extracted model, extracting both the higher functionalities and the lower functionalities to be maintained by the extract model, to form the set of extracted functionalities.

3. A test support method comprising:
  receiving, by a test support device, a request for a system configuration including a specified product;
  storing, by the test support device, relation information indicating an identifier of each of one or more models, an identifier of each of a plurality of functionalities to be maintained by each model, and an identifier of each of one or more products capable of implementing each functionality, a configuration of each model defined by the plurality of functionalities maintained by the model and the products capable of implementing each functionality;
  identifying, by the test support device, a functionality implemented by the specified product, from the relation information;
  extracting, by the test support device, a set of extracted models that maintain the identified functionality, from the relation information;
  generating, by the test support device, a set of test cases for the extracted models and a set of configurations for the extracted models by, for each extracted model of the set of extracted models:
    extracting a set of functionalities to be maintained by the extracted model, from the relation information;
    generating, for each extracted functionality of the set of extracted functionalities, a set of implementing products capable of implementing the extracted functionality, from the relation information; and
    extracting a configuration of the extracted model, as one of the set of configurations, by calculating directly product between the sets of implementing products generated for the extracted functionalities, from the relation information;
    storing test case information including an identifier of a test case related to the extracted model, as one of the set of test cases, from the relation information; and
    outputting the identifier of the test case related to the extracted model;
  constructing, by the test support device, a set of systems, each system configured in accordance with a corresponding configuration of the set of configurations; and
  testing, by the test support device, the set of systems, each system tested based on a corresponding test case having the outputted identifier of the set of test cases.

4. A non-transitory computer readable storage medium recording thereon a computer program causing a computer to perform a method comprising:
  receiving a request for a system configuration including a specified product;
  storing relation information indicating an identifier of each of one or more models, an identifier of each of a plurality of functionalities to be maintained by each model, and an identifier of each of one or more products capable of implementing each functionality, a configuration of each model defined by the plurality of functionalities maintained by the model and the products capable of implementing each functionality;
  identifying a functionality implemented by the specified product, from the relation information;
  extracting a set of extracted models that maintain the identified functionality, from the relation information;
  generating a set of test cases for the extracted models and a set of configurations for the extracted models by, for each extracted model of the set of extracted models:
    extracting a set of functionalities to be maintained by the extracted model, from the relation information;
    generating, for each extracted functionality of the set of extracted functionalities, a set of implementing products capable of implementing the extracted functionality, from the relation information; and
    extracting a configuration of the extracted model, as one of the set of configurations, by calculating directly product between the sets of implementing products generated for the extracted functionalities, from the relation information;
    storing test case information including an identifier of a test case related to the extracted model, as one of the set of test cases, from the relation information; and
    outputting the identifier of the test case related to the extracted model;
  constructing a set of systems, each system configured in accordance with a corresponding configuration of the set of configurations; and
  testing the set of systems, each system tested based on a corresponding test case having the outputted identifier of the set of test cases.

5. A test support device comprising:
  means for receiving a request for a system configuration including a specified product;
  means for storing relation information indicating an identifier of each of one or more models, an identifier of each of a plurality of functionalities to be maintained by each model, and an identifier of each of one or more products capable of implementing each functionality, a configuration of each model defined by the plurality of functionalities maintained by the model and the products capable of implementing each functionality;
  means for identifying a functionality implemented by the specified product, from the relation information;
  means for extracting a set of extracted models that maintain the identified functionality, from the relation information;
  means for generating a set of test cases for the extracted models and a set of configurations for the extracted models by, for each extracted model of the set of extracted models:
    extracting a set of functionalities to be maintained by the extracted model, from the relation information;
    generating, for each extracted functionality of the set of extracted functionalities, a set of implementing products capable of implementing the extracted functionality, from the relation information; and
    extracting a configuration of the extracted model, as one of the set of configurations, by calculating directly product between the sets of implementing products generated for the extracted functionalities, from the relation information;
    storing test case information including an identifier of a test case related to the extracted model, as one of the set of test cases, from the relation information; and
    outputting the identifier of the test case related to the extracted model;
  means for constructing a set of systems, each system configured in accordance with a corresponding configuration of the set of configurations; and
  means for testing the set of systems, each system tested based on a corresponding test case having the outputted identifier of the set of test cases.

* * * * *